(12) United States Patent
Serizawa et al.

(10) Patent No.: US 12,248,324 B2
(45) Date of Patent: Mar. 11, 2025

(54) CONVEYANCE ROBOT

(71) Applicant: TOYOTA JIDOSHA KABUSHIKI KAISHA, Toyota (JP)

(72) Inventors: Kazumi Serizawa, Toyota (JP);
Hidekazu Sasaki, Yokohama (JP);
Daisuke Sato, Toyota (JP); Shunsuke Mogi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 17/861,874

(22) Filed: Jul. 11, 2022

(65) Prior Publication Data

US 2023/0058651 A1 Feb. 23, 2023

(30) Foreign Application Priority Data

Aug. 18, 2021 (JP) .................. 2021-133567

(51) Int. Cl.
  *G05D 1/00* (2024.01)
(52) U.S. Cl.
  CPC ......... *G05D 1/0234* (2013.01); *G05D 1/0238* (2013.01)
(58) Field of Classification Search
  None
  See application file for complete search history.

(56) References Cited

U.S. PATENT DOCUMENTS

2020/0242544 A1\* 7/2020 Galluzzo ................ B25J 9/1692

FOREIGN PATENT DOCUMENTS

| JP | 2020205044 A | \* 12/2020 |
| JP | 2021-033581 A | 3/2021 |

OTHER PUBLICATIONS

David Molina, Unmanned transportation vehicle and transportation operation method using same (Year: 2020) NPL attached.\*

\* cited by examiner

*Primary Examiner* — James M McPherson
*Assistant Examiner* — Bakari Underwood
(74) *Attorney, Agent, or Firm* — Sughrue Mion, PLLC

(57) ABSTRACT

A conveyance robot includes a main body at which a conveyed object can be placed; a driving wheel provided at the main body; a memory; and a processor coupled to the memory. The processor is configured to control the driving wheel such that a progress direction of the conveyance robot is configured to match an extension direction of a running path guide portion, the running path guide portion extending along a running path that is along a wall face of a wall disposed in a building.

2 Claims, 13 Drawing Sheets

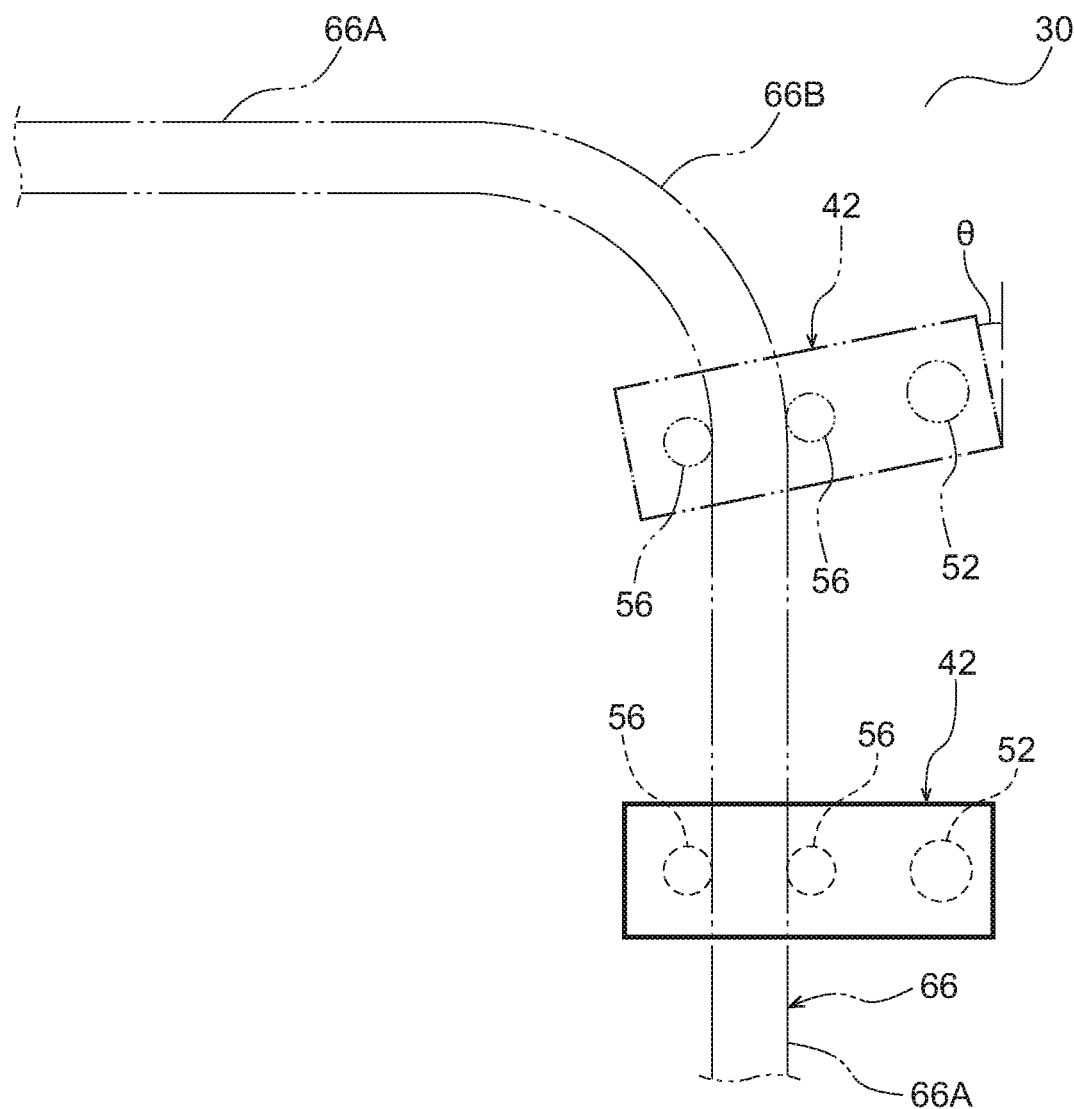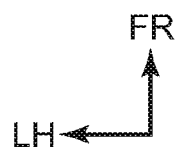

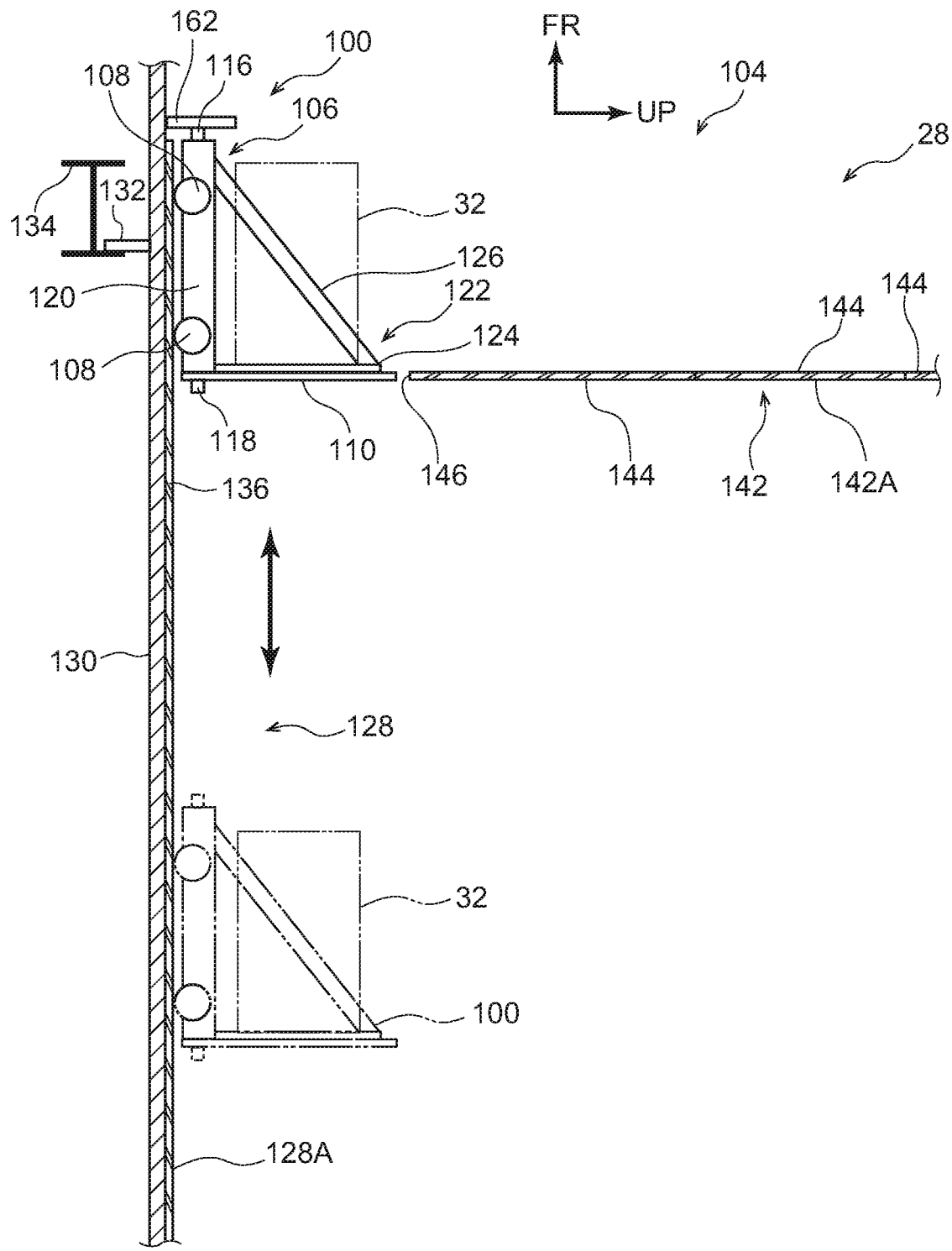

CONVEYANCE ROBOT

CROSS-REFERENCE TO RELATED APPLICATION

This application claims priority under 35 USC 119 from Japanese Patent Application No. 2021-133567 filed on Aug. 18, 2021, the disclosure of which is incorporated by reference herein in its entirety.

BACKGROUND

Technical Field

The present disclosure relates to a conveyance robot.

Related Art

Japanese Patent Application Laid-Open (JP-A) No. 2021-033581 discloses an invention relating to a delivery system.

This delivery system is equipped with a user terminal, a delivery management device and a delivery robot (a conveyance robot). The delivery management device notifies the user terminal with information relating to a package, the delivery management device receives a delivery instruction for the package from the user terminal that received the notification, the delivery management device searches for a route to a delivery destination of the package whose delivery instruction has been received, and the delivery management device uses information on a route that is found and causes the delivery robot to deliver the package.

For the delivery robot to be caused to move to package delivery destinations, the delivery robot must have a configuration capable of autonomous running. Accordingly, a global positioning system (GPS) device for acquiring positions of the delivery robot, various sensors for detecting obstructions in the vicinity of the delivery robot, and so forth must be installed. Thus, structures and control of the delivery robot become complicated.

In the event that a movement range of a delivery robot is limited to the interior of a building, structures and control of the delivery robot may be simplified. Specifically, when markers are arranged on floor surfaces in the building along running paths of the delivery robot and the delivery robot is caused to run along the markers, control relating to acquisition of positions of the delivery robot and setting of running paths is unnecessary, and the structures and control of the delivery robot may be simplified.

However, when markers are arranged on floor surfaces in a building, the markers are likely to be damaged by people and objects moving over the markers. Therefore, there are still challenges in maintaining running paths of a delivery robot.

SUMMARY

In consideration of the circumstances described above, the present disclosure provides a conveyance robot with which structures and control of the conveyance robot may be simplified while running paths may be easily maintained.

A conveyance robot according to a first aspect of the present disclosure includes: a main body at which a conveyed object can be placed; a driving wheel provided at the main body; a memory; and a processor coupled to the memory. The processor controls the driving wheel such that a progress direction of the conveyance robot matches an extension direction of a running path guide portion, the running path guide portion extending along a running path that is along a wall face of a wall disposed in a building.

According to the conveyance robot of the first aspect, the main body and the driving wheel equipped to the main body are provided, and a conveyed object may be conveyed in a state in which the conveyed object is placed on the main body.

In the present disclosure, the processor coupled to the memory is provided. The processor controls the driving wheel such that a progress direction of the conveyance robot matches the extension direction of the running path guide portion that extends along the running path of the conveyance robot.

The conveyance robot may be caused to run along the running path without control being performed to acquire positions of the running robot, to set a running path of the robot and the like.

When a running path guide portion is disposed on a floor surface in a building, the running path guide portion is likely to be damaged by people, objects and the like moving over the running path guide portion.

In the present disclosure, the processor can control the driving wheel on the basis of the extension direction of the running path guide portion that extends along the wall face of a wall disposed in a building. Therefore, the processor may control the running path of the conveyance robot without a running path guide portion being arranged on the floor surface in the building. As a result, damage to the running path guide portion by movements of people and objects in the building may be suppressed.

In a conveyance robot according to a second aspect of the present disclosure, the first aspect further includes: a turning portion that is guided along a railing provided at the building, the railing serving as the running path guide portion, and the turning portion being supported such that it is turnable relative to the main body about an axis in a height direction of the main body; and a turning angle sensor that is configured to detect a turning angle of the turning portion with respect to the progress direction of the conveyance robot, relative to a position of the turning portion in a case in which the extension direction of the running path guide portion and the progress direction match. The processor is configured to control the driving wheel such that the turning angle of the turning portion is 0°.

According to the conveyance robot of the second aspect, the turning portion is also provided. The turning portion can be guided along a railing that serves as the running path guide portion, and the turning portion is supported at the main body of the conveyance robot to be relatively turnable about the axis in the height direction of the main body.

During running of the conveyance robot, when the progress direction of the conveyance robot does not match the extension direction of the railing, that is, when the progress direction deviates from the running path of the conveyance robot, the turning portion turns about the axis in the height direction of the main body.

The conveyance robot is further provided with the turning angle sensor. The turning angle sensor detects turning angles of the turning portion with respect to the progress direction, relative to the position of the turning portion in a case in which the progress direction of the conveyance robot matches the extension direction of a railing.

The processor controls the driving wheel such that the turning angle of the turning portion is 0°, that is, such that the progress direction of the conveyance robot matches the extension direction of the railing. As a result, the conveyance robot is caused to run along the railing.

In a conveyance robot according to a third aspect of the present disclosure, in the second aspect, a handrail is provided at the main body, the handrail being provided with a grip portion that is grippable by a walking person.

According to the conveyance robot of the third aspect, the conveyance robot runs along the railing provided in a building as described above.

However, when the conveyance robot runs along the railing, it is difficult for a walking person to use a portion of the railing in a vicinity of the conveyance robot.

In the present disclosure, the handrail is provided at the main body and the handrail is equipped with the grip portion that a walking person may grip. Therefore, in the present disclosure, a walking person in the vicinity of the conveyance robot may use the handrail provided at the conveyance robot instead of the railing.

In a conveyance robot according to a fourth aspect of the present disclosure, the conveyance robot of the first aspect further includes an imaging device capable that is configured to detect the running path guide portion. A decorative panel is provided at a lower side of the main body, the decorative panel being configured to be accommodated in a penetrating portion provided at a ceiling of the building and structuring a portion of a ceiling face of the ceiling. At least an outer periphery portion of the driving wheel includes a magnet. The magnet is attracted to a running plate, which includes a ferromagnetic body, which structures a portion of the wall, and that extends in a vertical direction at the lower side of the penetrating portion. The driving wheel is configures to move in the vertical direction. The processor is configured to detect a running line with the imaging device, the running line extending in the vertical direction at the lower side of the penetrating portion, as seen in a horizontal direction, and the running line serving as the running path guide portion. The processor is configured to control the driving wheel such that an orientation angle formed between the progress direction of the conveyance robot and the extension direction of the running line is 0°, relative to an orientation angle in a case in which the progress direction of the conveyance robot matches the extension direction of the running line.

According to the conveyance robot of the fourth aspect, the decorative panel is provided at the lower side of the main body. The decorative panel is accommodated in a penetrating portion provided at a ceiling of the building, and the decorative panel may structure a portion of the ceiling face of the ceiling.

At least the outer periphery portion of the driving wheel includes the magnet. At the lower side of the penetrating portion of the ceiling, the running plate, which structures part of the wall and which includes a ferromagnetic body, extends in the vertical direction. The driving wheel is attracted to the running plate and the conveyance robot may run along the wall.

The conveyance robot is equipped with the imaging device. The imaging device may detect the running line that extends in the vertical direction at the lower side of the penetrating portion of the ceiling, as seen in the horizontal direction. The processor is configured to control the driving wheel such that the orientation angle formed between the progress direction of the robot and the extension direction of the running line is 0°. Therefore, the progress direction of the conveyance robot may be set to the vertical direction.

Thus, in the present disclosure, a conveyed object placed on the main body may be stowed above a ceiling at usual times without adversely affecting the appearance of the ceiling. Then, when the conveyed object is required, the conveyance robot may be caused to move to the lower side in the vertical direction and the conveyed object may be moved from above the ceiling.

As described above, the conveyance robot according to the first aspect has effects in that structures and control may be simplified while running paths may be easily maintained.

The conveyance robot according to the second aspect has an effect in that already existing railings in a building may be used to set running paths.

The conveyance robot according to the third aspect has an effect in that a walking person may be aided even while a conveyed object is being conveyed.

The conveyance robot according to the fourth aspect has an effect in that dead space in a building may be used for stowage and conveyance of conveyed objects.

BRIEF DESCRIPTION OF THE DRAWINGS

Embodiments will be described in detail based on the following figures, wherein:

FIG. 8 is a plan view schematically showing relationships between the turning portion and a railing during running of the conveyance robot according to the first exemplary embodiment;

FIG. 9 is a side view schematically showing structures of a conveyance robot according to a second exemplary embodiment;

DETAILED DESCRIPTION

A first exemplary embodiment of a conveyance robot according to the present disclosure is described using FIG.

Figure 1:
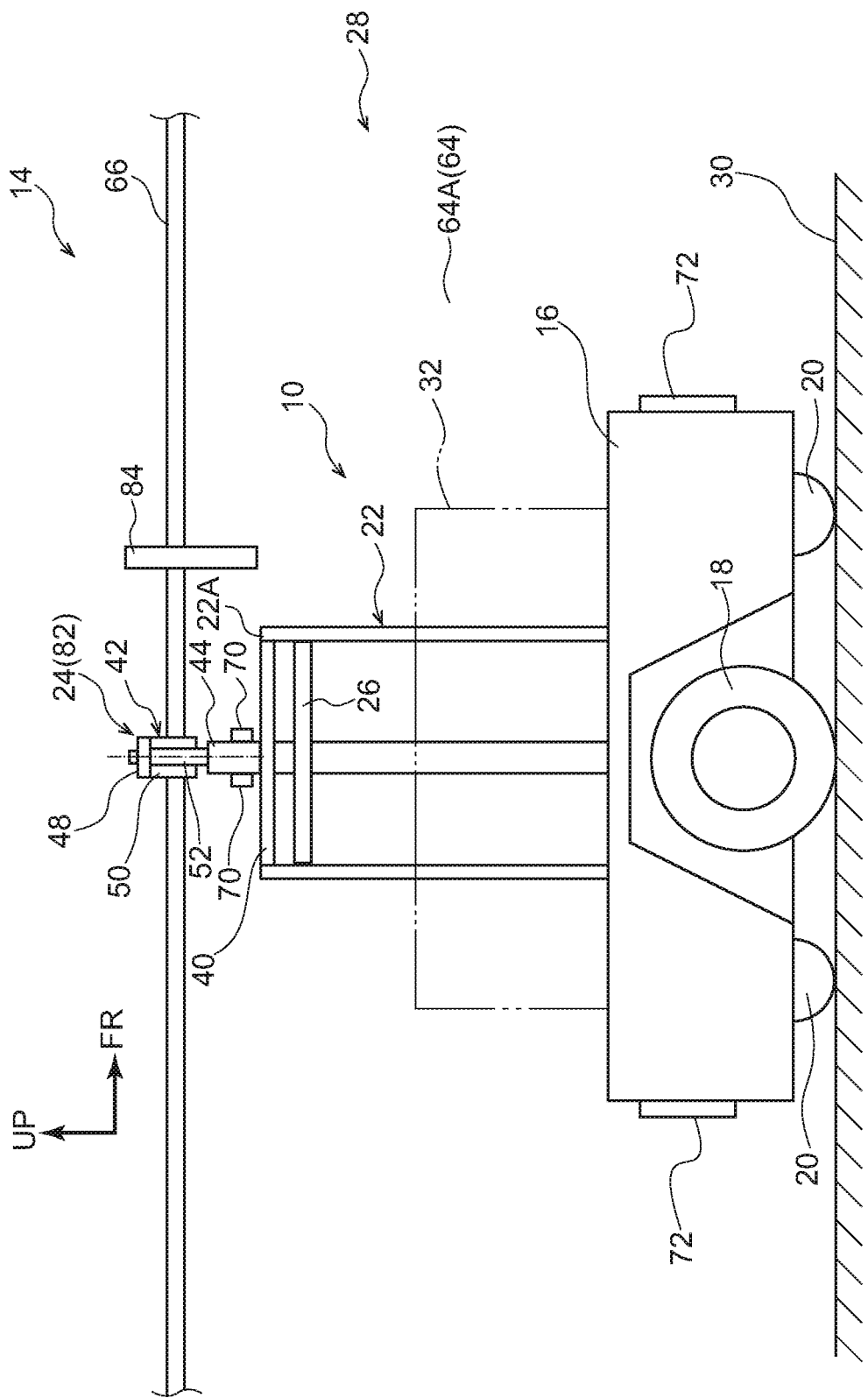
FIG. 1 is a side view schematically showing structures of a conveyance robot according to a first exemplary embodiment.

1 to FIG. 8. As shown in FIG. 1, a conveyance robot 10 according to the present exemplary embodiment structures a portion of a conveyance system 14 along with a gate apparatus 12, which is described below (see FIG. 6).

Figure 2:
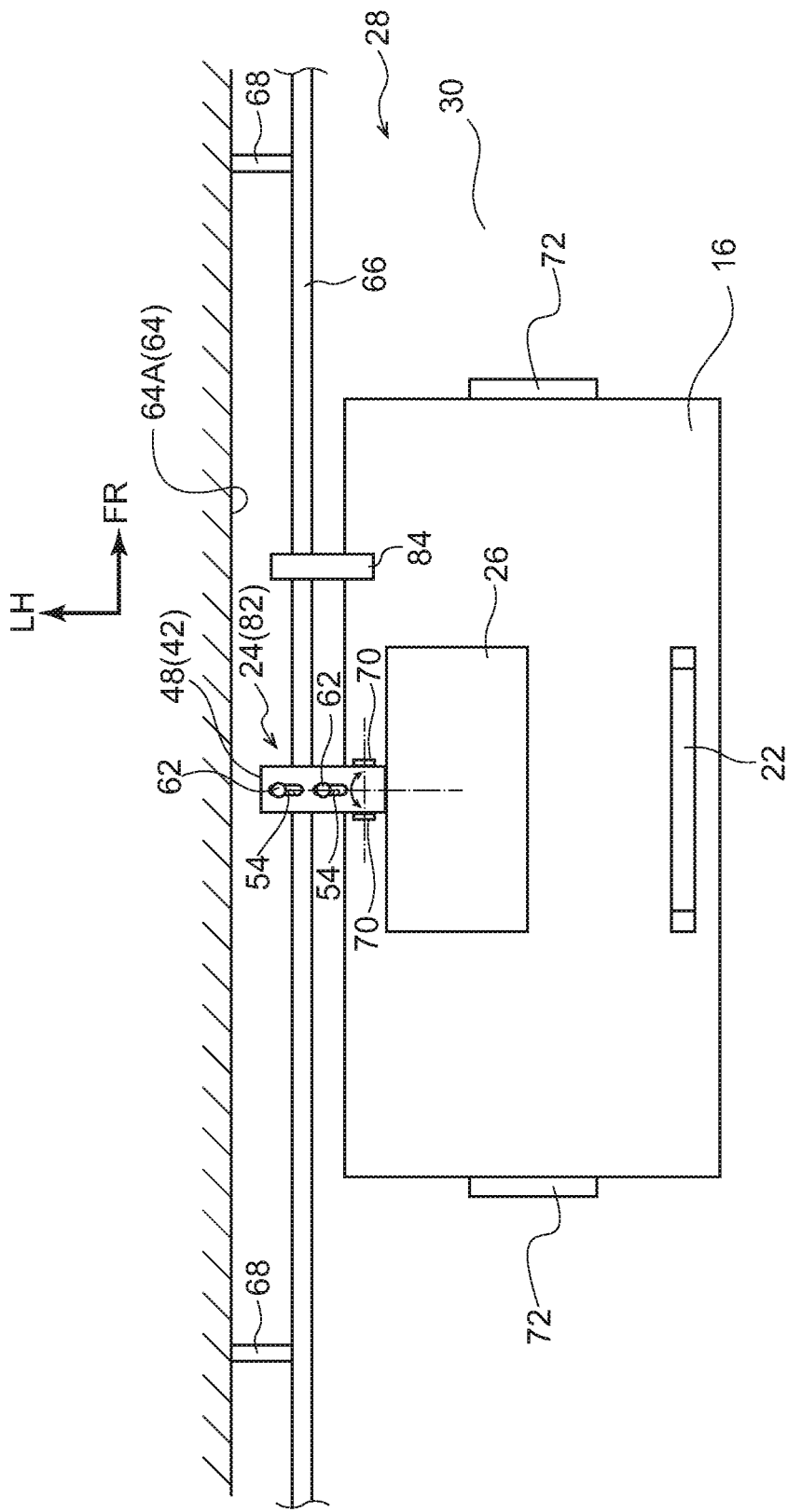
FIG. 2 is a plan view schematically showing the structures of the conveyance robot according to the first exemplary embodiment.

As shown in FIG. 2, the conveyance robot 10 is equipped with a main body 16, a pair of driving wheels 18, a pair of casters 20, a handrail 22, a direction control device 24 and a tray 26. The conveyance robot 10 is capable of running along a path 30 in a building 28.

The conveyance robot 10 has a symmetrical structure in a front-rear direction thereof. For convenience of description, an arrow FR shown in the drawings indicates the front side in the front-rear direction of the conveyance robot 10, an arrow UP indicates the upper side in a height direction of the conveyance robot 10, and an arrow LH indicates the left side in a width direction of the conveyance robot 10. Below, unless otherwise specified, a front-rear direction refers to the front-rear direction of the conveyance robot 10, a height direction refers to the height direction of the conveyance robot 10, and a width direction refers to the width direction of the conveyance robot 10.

The main body 16 is formed in a cuboid shape whose long direction is in the front-rear direction. A conveyed object 32 may be placed on an upper face of the main body 16. Examples of the conveyed object 32 that may be mentioned include various products packed in cardboard boxes and the like.

The driving wheels 18 are provided at both sides in the width direction of a front-rear direction central portion of the main body 16. Motors 34 (see FIG. 4) that apply driving force to the driving wheels 18 are connected to the corresponding driving wheels 18 via transmission shafts that are not shown in the drawings. The casters 20 are respectively provided at width direction central portions of regions at both sides in the front-rear direction of the main body 16.

Figure 4:
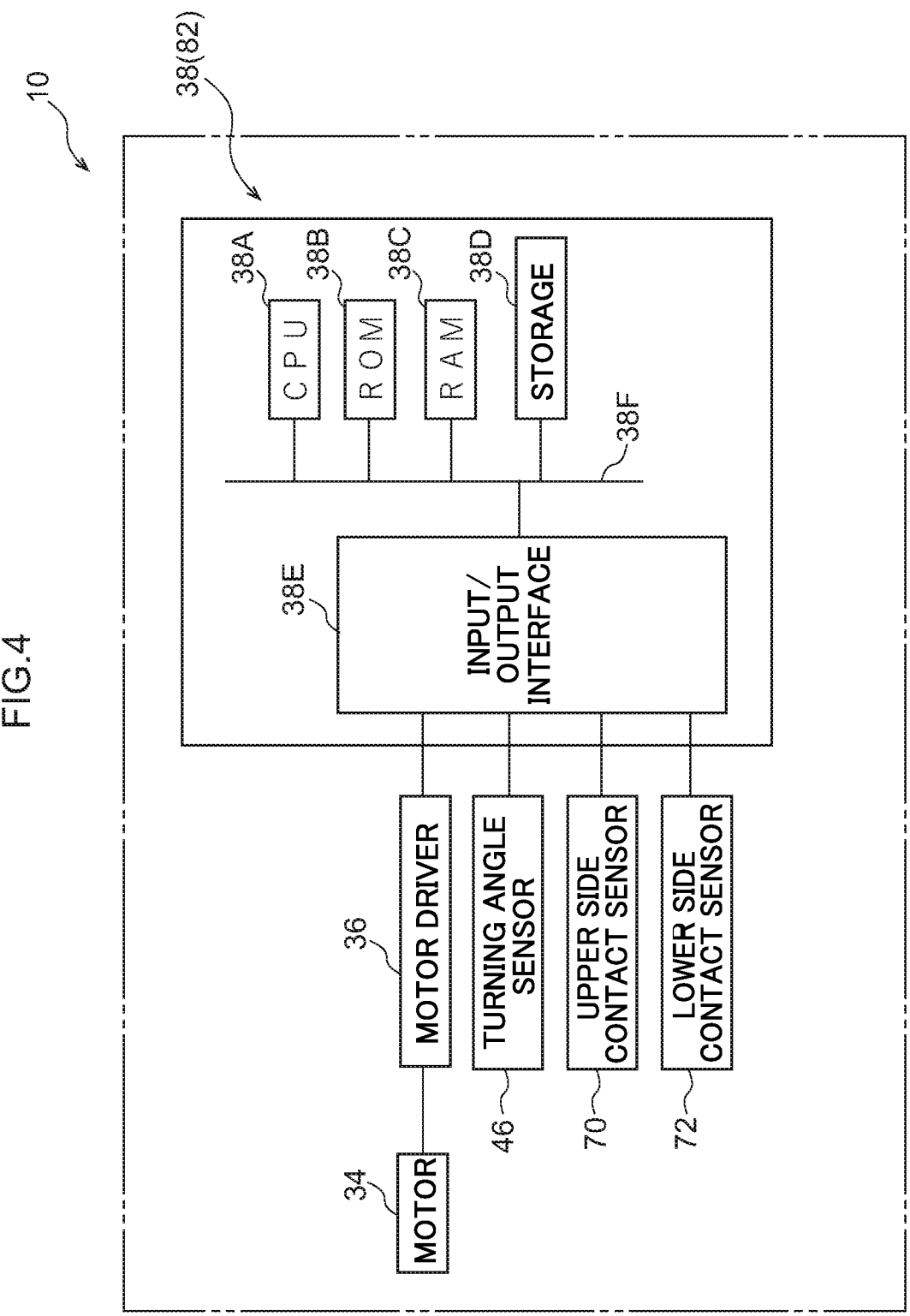
FIG. 4 is a block diagram showing hardware structures of the conveyance robot according to the first exemplary embodiment.

As shown in FIG. 4, a pair of motor drivers 36 and a control device 38 are mounted at the main body 16. The motor drivers 36 are electronically connected to the respectively corresponding motors 34 and to the control device 38. Electronic equipment mounted at the conveyance robot 10 such as the motors 34 and the like is supplied with electric power from a battery mounted at the main body 16, which is not shown in the drawings.

The handrail 22 is provided at a region at the width direction right side of the front-rear direction central portion of the main body 16. Principal portions of the handrail 22 are structured by a pipe member bent into a "U" shape as seen in the width direction, which opens to the lower side in the height direction.

A rubber grip 40 that extends in the front-rear direction is attached to a height direction upper side of the handrail 22. The rubber grip 40 serves as a grip portion 22A that a walking person, who is not shown in the drawings, may grip.

Figure 3:
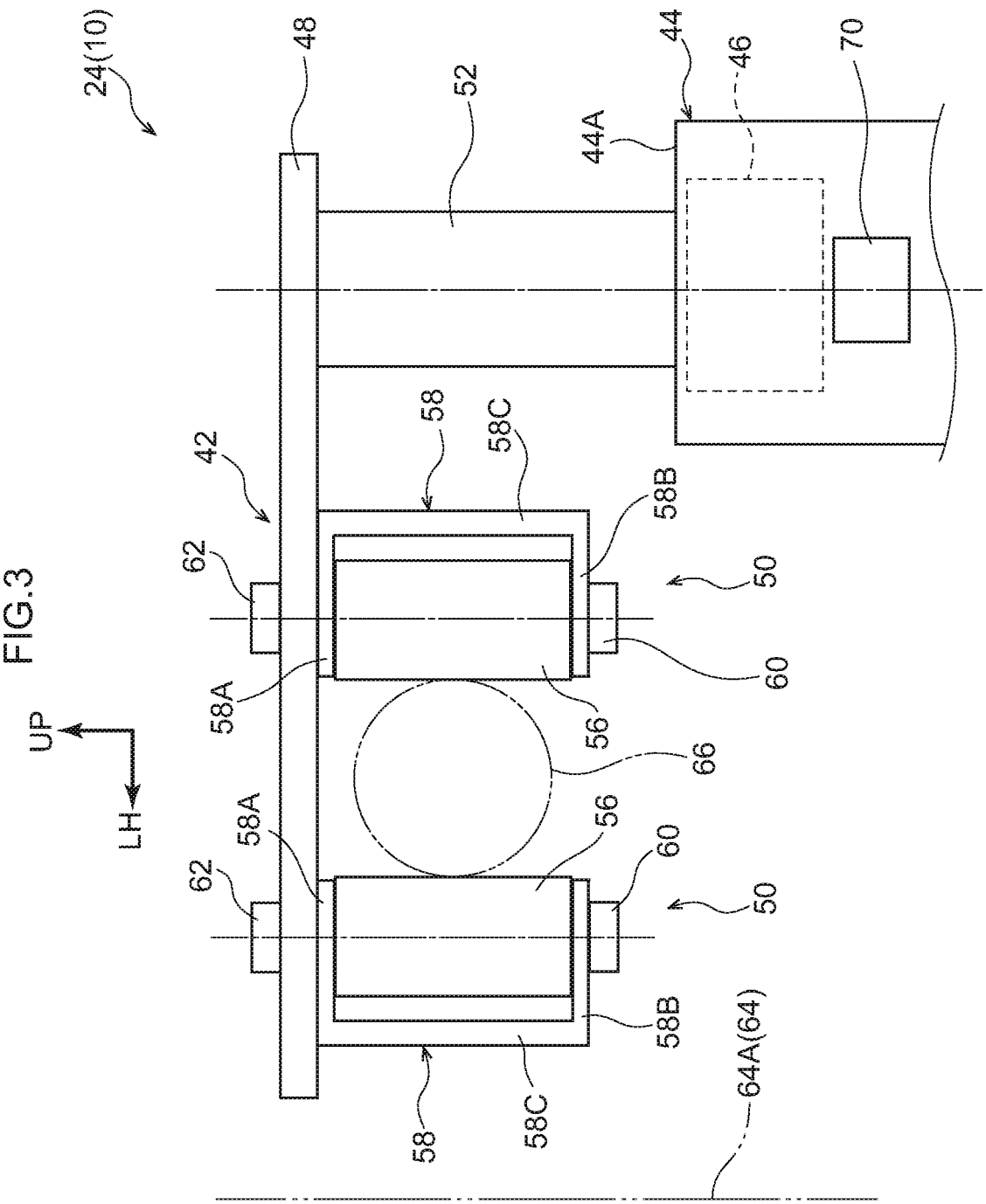
FIG. 3 is an elevation view schematically showing structures of a turning portion of the conveyance robot according to the first exemplary embodiment.

As shown in FIG. 1 to FIG. 3, the direction control device 24 is equipped with a turning portion 42, a support pillar 44 that supports the turning portion 42, and a turning angle sensor 46 that serves as a turning angle detection portion.

The turning portion 42 is equipped with a top plate 48, a pair of guide portions 50 attached to the top plate 48, and a support shaft 52. Below, unless otherwise specified, descriptions proceed with the assumption that the turning portion 42 is at a reference position thereof.

The top plate 48 structures a portion at the height direction upper side of the turning portion 42 and is formed in a rectangular plate shape in plan view. A long direction of the top plate 48 is arranged in the width direction. Slits 54 that extend in the width direction are provided at the top plate 48, at a width direction left side region and a width direction middle region of the top plate 48. The slits 54 are disposed on the same straight line extending in the width direction at the top plate 48.

Each guide portion 50 is equipped with a roller 56, a support bracket 58, a bolt 60 and a nut 62. The roller 56 is fabricated of rubber and is formed in a cylindrical shape that extends in the height direction. The roller 56 is supported at the support bracket 58 via the bolt 60 and the nut 62.

In more detail, the support bracket 58 includes an upper wall 58A, a lower wall 58B and a side wall 58C. The upper wall 58A extends in the width direction with a thickness direction in the height direction. The lower wall 58B is disposed to be parallel with the upper wall 58A at the height direction lower side of the upper wall 58A, with a thickness direction in the height direction. The side wall 58C connects an end portion of the upper wall 58A with an end portion of the lower wall 58B in the height direction. Insertion portions, which are not shown in the drawings, are formed in the upper wall 58A and the lower wall 58B.

In a state in which the roller 56 is disposed between the upper wall 58A and lower wall 58B of the support bracket 58, the bolt 60 is inserted, from the height direction lower side of the lower wall 58B, through the insertion portions of the upper wall 58A and lower wall 58B, the roller 56 and the corresponding slit portion 54. In this state, the nut 62 is fastened to the bolt 60. Thus, the guide portion 50 is attached to the top plate 48.

The pair of guide portions 50 structured as described above are disposed such that the rollers 56 oppose one another in the width direction. A railing 66, which serves as a running path guide portion, extends along a wall face 64A of a wall 64 disposed in the building 28. The railing 66 is sandwiched in the width direction by the pair of rollers 56.

The railing 66 is formed as a circular rod shape and extends along the path 30 along which the conveyance robot 10 is to run. The railing 66 is supported from a building lower side at the wall face 64A by support portions 68, which are provided at predetermined spacings in the extension direction of the path 30.

The support shaft 52 is formed in a cylindrical shape extending in the height direction. The support shaft 52 projects toward the height direction lower side from an end portion at the width direction right side of the top plate 48. A portion at the height direction lower side of the support shaft 52 is supported at the support pillar 44.

The support pillar 44 is formed in a square tube shape with a closed end. An insertion portion, which is not shown in the drawings, is formed at an upper wall 44A of the support pillar 44. The support shaft 52 is inserted into the insertion portion of the upper wall 44A from the height direction upper side thereof. The support shaft 52 is supported at the support pillar 44 via a bearing to be turnable about an axis that is in the height direction. The bearing, which is not shown in the drawings, is fixed at the height direction lower side of the upper wall 44A.

As seen in the width direction, the support shaft 52 is disposed such that the turning axis thereof and a center of turning of the driving wheels 18 are disposed on the same straight line extending in the height direction.

The turning angle sensor 46 is disposed at the height direction upper side of the inside of the support pillar 44 and is capable of detecting turning angles of the turning portion 42 relative to the support pillar 44. The turning angle sensor 46 is capable of outputting angle signals to the control device 38 on the basis of turning angles of the turning portion 42 with respect to a reference position.

The tray 26 is formed in a box shape of which the height direction upper side is open. The tray 26 is attached to the support pillar 44 so as to be disposed on the main body 16. Relatively light conveyed objects such as documents and the like may be placed on the tray 26.

A first characteristic of the present exemplary embodiment is that the progress direction of the conveyance robot 10 is matched with the extension direction of the railing 66 by control of the pair of driving wheels 18 by the control device 38 and the direction control device 24. A second characteristic is that the progress direction of the conveyance robot 10 may be switched by the control device 38 and various kinds of equipment. Below, structures of the various kind of equipment used for control of the pair of driving wheels 18 are described, with emphasis on the control device 38.

As shown in FIG. 4, the control device 38 includes a central processing unit (CPU) 38A, which is an example of a processor, read-only memory (ROM) 38B, random access memory (RAM) 38C, storage 38D, and an input/output interface 38E. The CPU 38A, ROM 38B, RAM 38C, storage 38D and input/output interface 38E are connected to be capable of communicating with one another via a bus 38F.

The CPU 38A serves as a central arithmetic processing unit and is capable of executing various programs relating to various kinds of control of the conveyance robot 10. More specifically, the CPU 38A is capable of reading a program from the ROM 38B and executing the program, using the RAM 38C as a work area. When an executable program memorized in the ROM 38B is loaded and executed by the CPU 38A, the control device 38 is capable of manifesting various functions as described below.

The storage 38D includes a hard disk drive (HDD) or solid state drive (SSD). The storage 38D memorizes various programs, including an operating system, and various kinds of data.

The input/output interface 38E is an interface for the control device 38 to communicate with various devices installed at the conveyance robot 10. The control device 38 is connected to be capable of mutual communication via the input/output interface 38E with devices that are described below. However, these devices may be connected directly to the bus 38F.

More specifically, the motor drivers 36 and turning angle sensor 46 described above and pairs of upper side contact sensors 70 and lower side contact sensors 72 are connected to the input/output interface 38E. The motor drivers 36 are capable of controlling rotary speeds, rotation directions and the like of the motors 34 by outputting control signals to the motors 34 on the basis of command signals inputted from the control device 38. In the present exemplary embodiment, the progress direction of the conveyance robot 10 may be altered by the rotary speeds, rotation directions and the like of the pair of motors 34 being respectively independently controlled by the control device 38 and the pair of motor drivers 36.

The upper side contact sensors 70 are respectively provided at a front side face and a rear side face in the front-rear direction of a portion at the height direction upper side of the support pillar 44. When either upper side contact sensor 70 senses contact of an object against the upper side contact sensor 70, the upper side contact sensor 70 outputs first contact signals to the control device 38.

The lower side contact sensors 72 are respectively provided at a front side face and a rear side face in the front-rear direction of the main body 16. When either lower side contact sensor 72 senses contact of an object against the lower side contact sensor 72, the lower side contact sensor 72 outputs second contact signals to the control device 38.

Figure 5:
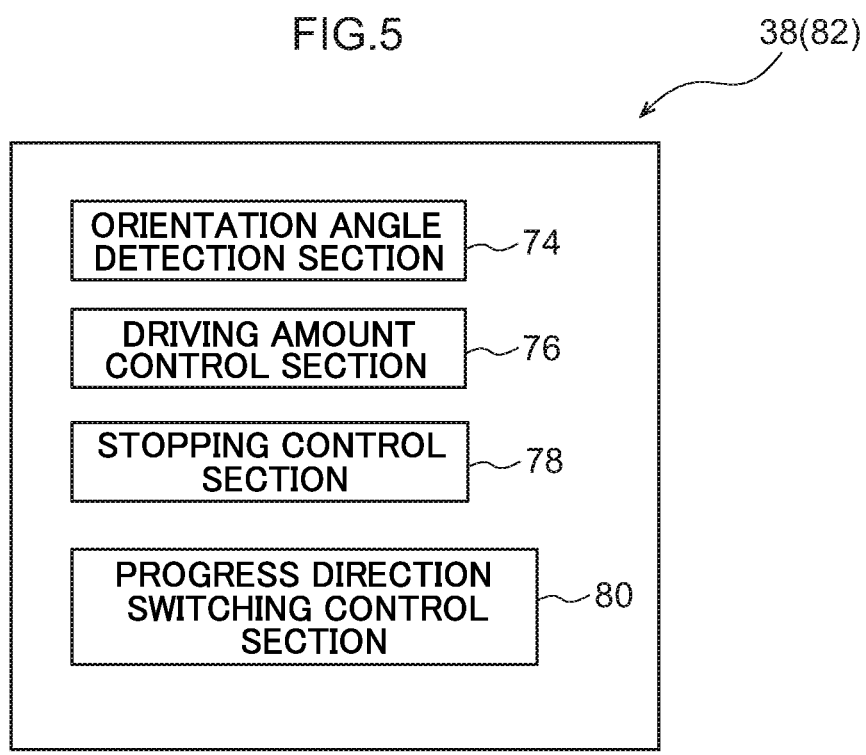
FIG. 5 is a block diagram showing functional structures of a control device installed at the conveyance robot according to the first exemplary embodiment.

Now, using FIG. 5, functional structures of the control device 38 are described. The CPU 38A of the control device 38 reads an executable program memorized at the ROM 38B and, by executing the program, functions as a combination of an orientation angle detection section 74, a driving amount control section 76, a stopping control section 78 and a progress direction switching control section 80.

At intervals of a predetermined duration, the orientation angle detection section 74 detects a turning angle θ of the turning portion 42 relative to the reference position on the basis of angle signals inputted from the turning angle sensor 46. As illustrated in FIG. 8, during running of the conveyance robot 10, the turning portion 42 is guided by the railing 66 and the turning angle θ may be regarded as an angle formed between the extension direction of the railing 66 and the progress direction of the conveyance robot 10, in other words, an orientation angle. The orientation angle detection section 74 detects angles to a counterclockwise direction relative to the reference position as positive values and detects angles to the clockwise direction relative to the reference position as negative values.

By controlling the motor drivers 36, the driving amount control section 76 controls driving amounts of the motors 34 such that a running speed of the conveyance robot 10 is, for example, 1 m/s. The driving amount control section 76 is capable of controlling driving amounts of the pair of motors 34 respectively independently in accordance with the turning angle θ detected by the orientation angle detection section 74.

During running of the conveyance robot 10, when the path 30 is a straight line, the turning portion 42 is guided along a linear portion 66A of the railing 66 and the progress direction of the conveyance robot 10 matches the extension direction of the railing 66, as illustrated in FIG. 8. Therefore, at the linear portion 66A, the turning portion 42 does not turn from the reference position.

Then, when the path 30 is a curved line, the turning portion 42 is guided along a corner portion 66B of the railing 66, and the extension direction of the railing 66 and the progress direction of the conveyance robot 10 are temporarily in a non-matching state. At this time, the turning portion 42 turns from the reference position and the orientation angle detection section 74 detects that the turning angle θ has a value other than 0°.

The driving amount control section 76 makes a determination as to whether a turning angle θ detected as described above is 0°. When the turning angle θ is not 0°, the driving amount control section 76 controls the motor drivers 36 and controls driving amounts of the motors 34 such that the turning angle θ is 0°. That is, the driving amount control section 76 conducts feedback control to control driving amounts of the motors 34 on the basis of values of the turning angle θ.

For example, when the conveyance robot 10 is to steer to the left side of the progress direction along the linear portion 66A, the driving amount control section 76 raises the rotary speed of the motor 34 that drives the driving wheel 18 at the width direction right side, and lowers the rotary speed of the motor 34 that drives the driving wheel 18 at the width direction left side.

If the turning angle θ does not go to 0°, the rotary speed of the motor 34 that drives the driving wheel 18 at the width direction right side is raised further and the rotary speed of the motor 34 that drives the driving wheel 18 at the width direction left side is lowered further.

Thus, the driving wheels 18 are controlled by the direction control device 24 and the driving amount control section 76 as described above and the conveyance robot 10 may run along the railing 66. That is, the path 30 sets a running path of the conveyance robot 10. Below, the combination of the direction control device 24 and the control device 38 is referred to as a driving control section 82.

The stopping control section 78 is capable of controlling the motors 34 on the basis of the first contact signals from the upper side contact sensors 70. More specifically, when the first contact signals are inputted during running of the conveyance robot 10, the stopping control section 78 outputs stopping signals to the pair of motor drivers 36 so as to stop driving of the motors 34.

On the other hand, when the first contact signals are inputted to the stopping control section 78 while the conveyance robot 10 is stopped, the stopping control section 78 outputs starting signals to the pair of motor drivers 36 so as to drive the motors 34.

In the present exemplary embodiment, as illustrated in FIG. 1, a stopper 84 is attached to the railing 66 at a stopping position of the conveyance robot 10. When one of the upper side contact sensors 70 comes into contact with the stopper 84 during running of the conveyance robot 10, the conveyance robot 10 stops at the stopping position. When the conveyance robot 10 is to be caused to run, a user removes the stopper 84 from the railing 66 and touches the one of the upper side contact sensors 70. Thus, the running of the conveyance robot 10 is resumed.

When the second contact signals are inputted from the lower side contact sensors 72 during running of the conveyance robot 10, the progress direction switching control section 80 outputs reversing signals to the pair of motor drivers 36 so as to reverse the rotation of the motors 34. Consequently, when one of the lower side contact sensors 72 comes into contact with an obstruction such as a wall or the like, the progress direction is set to the opposite direction from the progress direction before the contact of the lower side contact sensor 72, and the conveyance robot 10 returns along the predetermined path.

Figure 6:
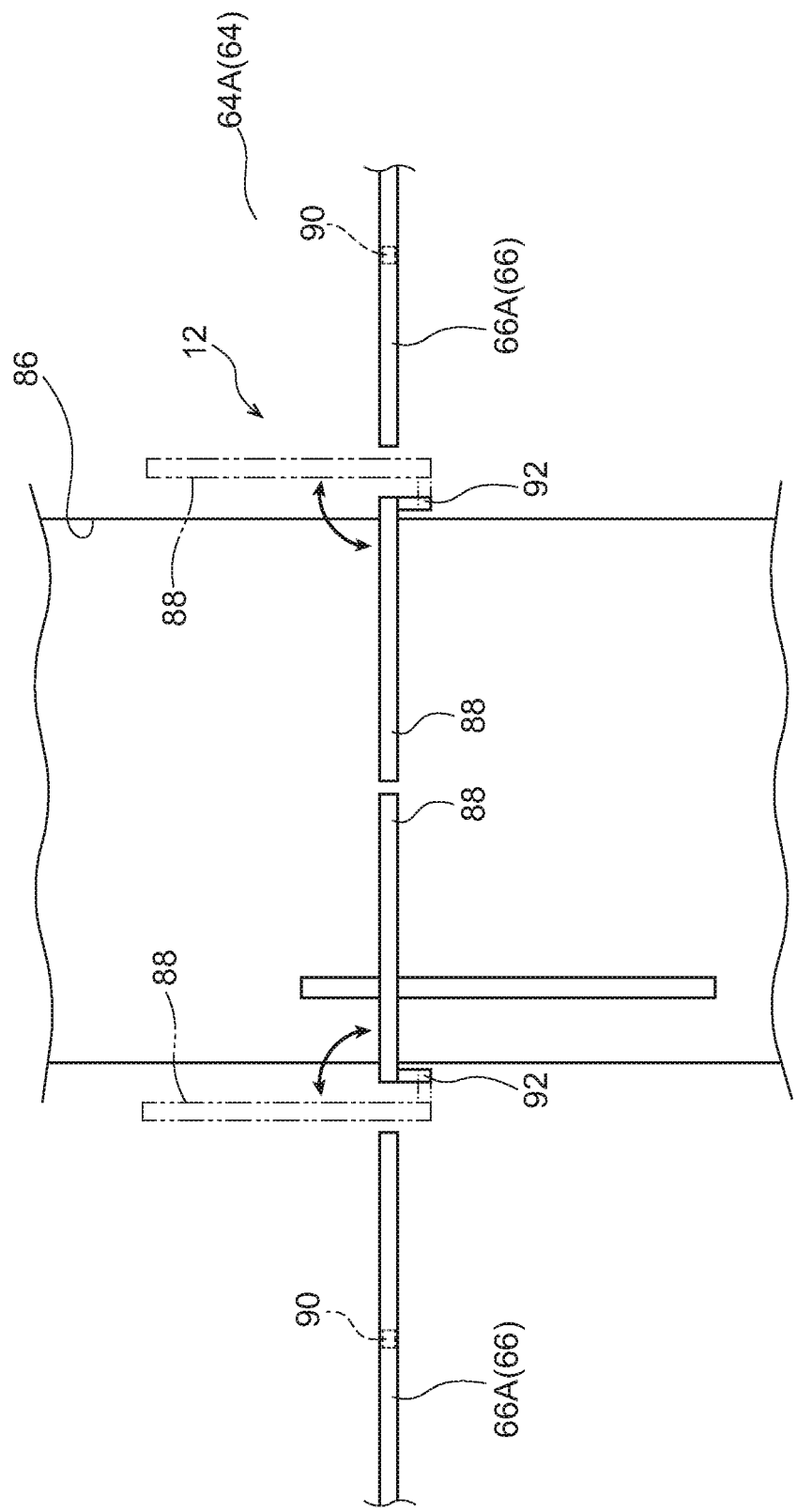
FIG. 6 is an elevation view schematically showing structures of a gate apparatus that structures a portion of a conveyance system according to the first exemplary embodiment.

As shown in FIG. 6, the gate apparatus 12 is disposed at a location at which an opening portion 86 is provided at the wall 64. The gate apparatus 12 is equipped with a pair of movable bars 88 and a pair of contact sensors 90.

Each movable bar 88 has basically the same structure as the linear portion 66A of the railing 66. A length of the movable bar 88 is set to a length that is around half of the opening width of the opening portion 86. In a usual state, the movable bar 88 is arranged in a vertical direction.

An end portion at one side of each movable bar 88 is attached to a periphery edge portion at one side or the other side in the width direction of the opening portion 86 via a support portion 92 and an actuator, which is not shown in the drawings. The actuators are driven on the basis of third contact signals from the contact sensors 90 so as to turn the movable bar 88 around an axis in a thickness direction of the wall 64.

Each contact sensor 90 is disposed at a position at the linear portion 66A that is a predetermined distance away from the opening portion 86, at a side of the linear portion 66A at which the wall 64 is disposed. When the movable bars 88 are in the usual state and an object comes into contact with one of the contact sensors 90, the third contact signals are inputted to the actuators, the movable bars 88 are turned 90° about the axis in the thickness direction of the wall 64 by the actuators, and the movable bars 88 go into a lowered state in which the movable bars 88 are arranged on the same straight line as the linear portion 66A.

Then, when the movable bars 88 are in the lowered state and an object comes into contact with the other of the contact sensors 90, the third contact signals are inputted to the actuators, the movable bars 88 are turned 90° about the axis in the thickness direction of the wall 64 by the actuators, and the movable bars 88 go into the usual state.

At the gate apparatus 12 that is structured as described above, when the rollers 56 of the turning portion 42 come into contact with one of the contact sensors 90 while the movable bars 88 are in the usual state, the movable bars 88 go into the lowered state. Thus, the running path of the conveyance robot 10 may be set even at a location of the wall 64 at which the opening portion 86 is formed. After the conveyance robot 10 has passed in front of the opening portion 86, the movable bars 88 return to the usual state. Thus, the opening portion 86 may be returned to a state in which people and the like may pass through the opening portion 86.

Operation and Effects of the Present Exemplary Embodiment

Now, operation and effects of the present exemplary embodiment are described.

In the present exemplary embodiment, as shown in FIG. 1, the conveyance robot 10 is equipped with the main body 16 and the driving wheels 18 that are provided at the main body 16. In a state in which the conveyed object 32 is placed on the main body 16, the conveyed object 32 may be conveyed.

The conveyance robot 10 is further equipped with the driving control section 82. The driving wheels 18 are controlled by the driving control section 82 such that the progress direction of the conveyance robot 10 matches the extension direction of the railing 66 that extends along the running path of the conveyance robot 10.

Thus, the conveyance robot 10 may be caused to run along the running path without control relating to acquisition of positions of the conveyance robot 10, setting of the running path of the conveyance robot 10 or the like.

If a running path guide portion used for guidance of a running path of the conveyance robot 10 is disposed on a floor surface in the building 28, the running path guide portion is likely to be damaged by movements of people and objects over the running path guide portion.

However, in the present exemplary embodiment, the driving control section 82 may control the driving wheels 18 on the basis of the extension direction of the railing 66 that extends along the wall face 64A of the wall 64 disposed upright in the building 28. Therefore, a running path of the conveyance robot 10 may be set without a running path guide portion being disposed on a floor surface in the building 28. As a result, damage to the running path guide portion by movements of people and objects in the building 28 may be suppressed.

Thus, with the present exemplary embodiment, structures and control of the conveyance robot 10 may be simplified while running paths of the conveyance robot 10 may be easily maintained.

As shown in FIG. 2 and FIG. 3, the driving control section 82 is equipped with the turning portion 42. The turning portion 42 can be guided along the railing 66 and is supported to be turnable relative to the main body 16 of the conveyance robot 10 about an axis in the height direction of the main body 16.

Therefore, as illustrated in FIG. 8, when the progress direction of the conveyance robot 10 does not match the extension direction of the railing 66 while the conveyance robot 10 is running, that is, when the progress direction deviates from the running path of the conveyance robot 10, the turning portion 42 turns about the height direction of the main body 16.

The driving control section 82 is also equipped with the turning angle sensor 46. The turning angle sensor 46 detects turning angles θ of the turning portion 42 with respect to the progress direction, relative to the position of the turning portion 42 in a case in which the progress direction of the conveyance robot 10 matches the extension direction of the railing 66.

The driving control section 82 controls the driving wheels 18 such that the turning angle θ of the turning portion 42 is 0°, that is, such that the progress direction of the conveyance robot 10 matches the extension direction of the railing 66. Thus, the conveyance robot 10 may be caused to run along the railing 66.

Figure 7:
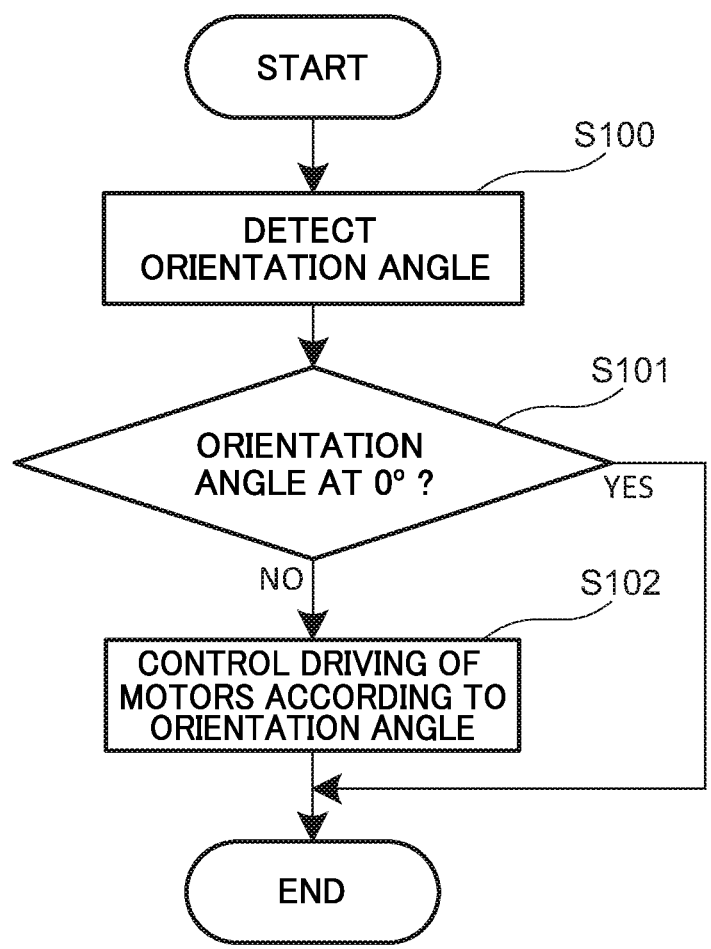
FIG. 7 is a flowchart showing a control flow of the conveyance robot according to the first exemplary embodiment that is conducted by the control device installed at the conveyance robot.

Below, an example of control flow of the conveyance robot 10 by the control device 38 is described, principally using the flowchart shown in FIG. 7. This control flow is started at predetermined time intervals when the CPU 38A receives predetermined control signals.

When this control flow begins, in step S100, the CPU 38A functions as the orientation angle detection section 74, detects a turning angle θ relative to the reference position of the turning portion 42 on the basis of angle signals inputted from the turning angle sensor 46, and proceeds to step S101.

In step S101, the CPU 38A functions as the driving amount control section 76, makes a determination as to whether the turning angle θ is at 0°, and when the turning angle θ is at 0° ("Yes" in step S101), ends the control flow. On the other hand, when the turning angle θ is not at 0° ("No" in step S101), the CPU 38A proceeds to step S102.

In step S102, the CPU 38A functions as the driving amount control section 76, controls the motor drivers 36 on the basis of the turning angle θ detected in step S100 such that the turning angle θ is 0°, and ends the control flow.

Thus, in the present exemplary embodiment, the already existing railing 66 in the building 28 may be used to set a running path of the conveyance robot 10.

Returning to FIG. 1, the handrail 22 is provided at the main body 16. The handrail 22 is equipped with the grip portion 22A that a walking person may grip. Therefore, a walking person in the vicinity of the conveyance robot 10 may use the handrail 22 provided at the conveyance robot 10 instead of the railing 66. Thus, while conveying the conveyed object 32, the present exemplary embodiment may assist rather than impeding walking by a walking person.

Second Exemplary Embodiment

Below, a conveyance robot 100 according to a second exemplary embodiment of the present disclosure is described using FIG. 9 to FIG. 13. Structural portions that are the same as in the first exemplary embodiment described above are assigned the same reference symbols, and descriptions thereof are not given.

Figure 10:
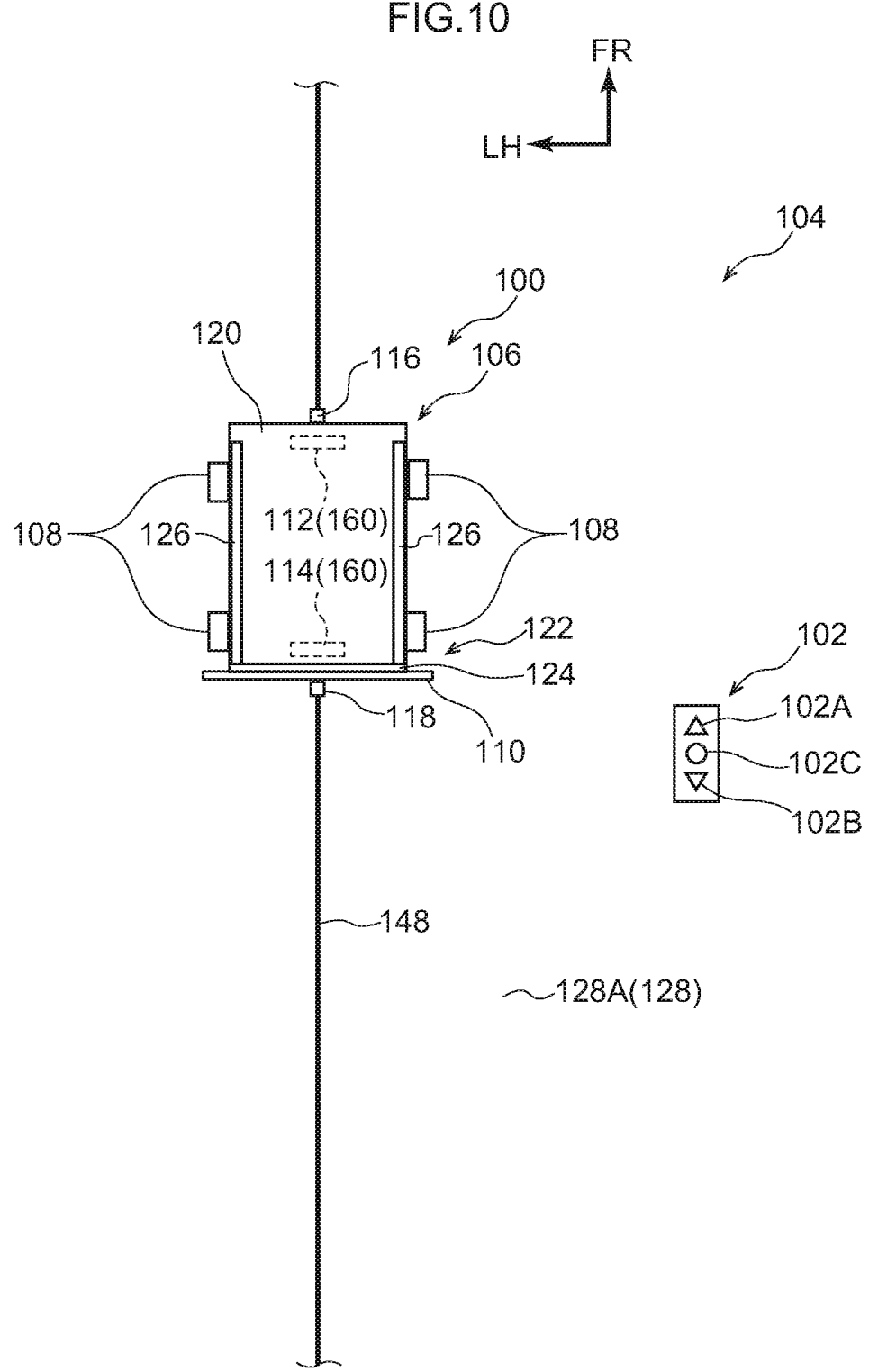
FIG. 10 is an elevation view schematically showing the structures of the conveyance robot according to the second exemplary embodiment.

As shown in FIG. 9 and FIG. 10, the conveyance robot 100 structures a portion of a conveyance system 104 along with a wireless controller 102, which is described below. The conveyance robot 100 is equipped with a main body 106, four driving wheels 108, a decorative panel 110, a first camera 112 serving as a detection portion, a second camera 114 serving as a detection portion, an upper side contact sensor 116 and a lower side contact sensor 118.

The arrow FR shown in the drawings indicates a front side in a front-rear direction of the conveyance robot 100, the arrow UP indicates an upper side in an elevation direction of the conveyance robot 100, and the arrow LH indicates a left side in a width direction of the conveyance robot 100. Below, unless otherwise specified, a front-rear direction refers to the front-rear direction of the conveyance robot 100, an elevation direction refers to the elevation direction of the conveyance robot 100, and a width direction refers to the width direction of the conveyance robot 100.

The main body 106 is equipped with a vehicle body portion 120 and a loading platform 122. The vehicle body portion 120 is formed in a cuboid shape whose long direction is in the front-rear direction. The loading platform 122 is provided at a face at the elevation direction upper side of the vehicle body portion 120.

The loading platform 122 includes a floor plate 124 and a pair of braces 126. The floor plate 124 is formed in a plate shape extending to the elevation direction upper side from an end portion at the front-rear direction rear side of the vehicle body portion 120. The floor plate 124 is attached to the vehicle body portion 120 by an attachment member that is not shown in the drawings. The braces 126 are disposed to be spaced apart from one another in the width direction, and are formed in plate shapes whose plate thickness directions are in the width direction. The braces 126 are joined to distal end portions of the floor plate 124 and to end portions at the front-rear direction front side of the vehicle body portion 120.

The driving wheels 108 are disposed to be spaced apart in the front-rear direction at side faces at both sides in the width direction of the vehicle body portion 120. At least outer periphery portions of the driving wheels 108 are structured with magnets. The driving wheels 108 of the present exemplary embodiment are capable of tightly adhering to a wall 128 of the building 28.

More specifically, the wall 128 is provided with a running plate 130 that structures a portion of the wall 128. The running plate 130 is disposed at a side of the wall 128 at which a wall face 128A is formed. The running plate 130 is constituted by a plate material including a ferromagnetic body of iron or the like. A plate thickness direction of the running plate 130 is in a thickness direction of the wall 128, and the running plate 130 extends in a building height direction, which is to say a vertical direction. Thus, the driving wheels 108 are attracted to the running plate 130, and the conveyance robot 100 is capable of running in the building height direction along the wall face 128A.

In a state in which the driving wheels 108 are tightly adhered to the wall 128, the front side of the conveyance robot 100 is at the building upper side. Therefore, the conveyed object 32 may be placed on the floor plate 124 of the loading platform 122 described above.

A portion of the running plate 130 at the building upper side is supported at a ceiling main beam 134 by a support member 132. A portion of the running plate 130 at the building lower side is supported at a floor main beam, which is not shown in the drawings, by another of the support member 132. An interior wall cloth 136 used for coating interior walls is applied to a surface of the running plate 130.

Figure 11:
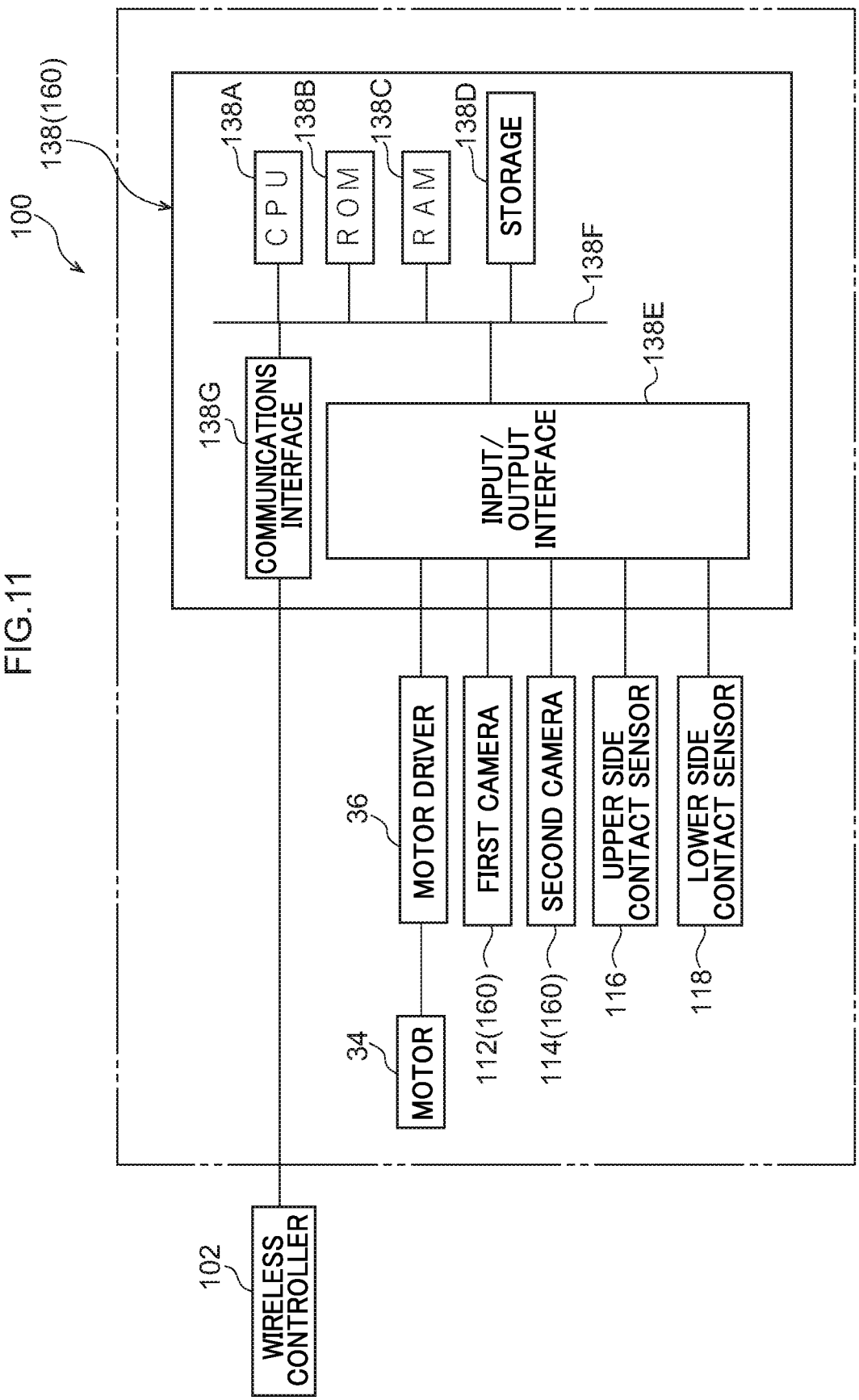
FIG. 11 is a block diagram showing hardware structures of the conveyance robot according to the second exemplary embodiment.

As shown in FIG. 11, the motors 34 are connected to the driving wheels 108 via transmission shafts that are not shown in the drawings. The motors 34 apply driving force to the driving wheels 108. Four of the motor drivers 36 and a control device 138 are mounted at the vehicle body portion 120. The motor drivers 36 are electronically connected to the respectively corresponding motors 34 and to the control device 138. The motor drivers 36 are capable of controlling rotary speeds and the like of the motors 34 on the basis of signals inputted from the control device 138. Electronic equipment mounted at the conveyance robot 100 such as the motors 34 and the like is supplied with electric power from a battery mounted at the vehicle body portion 120, which is not shown in the drawings.

Returning to FIG. 9, the decorative panel 110 is provided at a rear side of the main body 106. The decorative panel 110 is attached to the main body 106 by an attachment member that is not shown in the drawings. The decorative panel 110 is constituted of a material the same as a ceiling material 144 that constitutes a ceiling face 142A of a ceiling 142 of the building 28. A panel thickness direction of the decorative panel 110 is in the front-rear direction. The decorative panel 110 is formed in a rectangular plate shape that is capable of covering most of the main body 106 and the driving wheels 108 as seen from the rear side of the conveyance robot 100.

A penetrating portion 146 that accommodates the decorative panel 110 is formed in the ceiling 142 at a position adjacent to the wall 128. Thus, when the conveyance robot 100 is disposed at a predetermined position of the wall face 128A, the decorative panel 110 may structure a portion of the ceiling face 142A.

As shown in FIG. 10, the first camera 112 and second camera 114 are mounted at the vehicle body portion 120 and are disposed to be spaced apart from one another in the front-rear direction. The first camera 112 and second camera 114 are capable of capturing images to the elevation direction lower side of the conveyance robot 100. As shown in FIG. 11, the first camera 112 and second camera 114 are electronically connected to the control device 138. Data of images captured by the first camera 112 and second camera 114 is sent to the control device 138.

Returning to FIG. 10, a running line 148 is provided at the wall face 128A of the wall 128. The running line 148 serves as a running path guide portion extending in the vertical direction. The running line 148 is formed of black vinyl tape, black paint or the like. Seen in the thickness direction of the wall 128, that is, a horizontal direction, the running line 148 is disposed at the building lower side of the penetrating portion 146.

As seen in the thickness direction of the wall 128, the conveyance robot 100 is disposed relative to the wall face 128A such that the first camera 112 and second camera 114 are disposed over the running line 148.

The upper side contact sensor 116 is provided at an end portion at a front side of the vehicle body portion 120. As shown in FIG. 11, the upper side contact sensor 116 is electronically connected to the control device 138. When the upper side contact sensor 116 senses contact against an object, the upper side contact sensor 116 outputs first contact signals to the control device 138.

The lower side contact sensor 118 is provided at an end portion at a rear side of the vehicle body portion 120, and is electronically connected to the control device 138. When the lower side contact sensor 118 senses contact against an object, the lower side contact sensor 118 outputs second contact signals to the control device 138. An insertion portion through which the lower side contact sensor 118 can be inserted is formed in the decorative panel 110. A portion of the lower side contact sensor 118 is exposed at a rear side of the decorative panel 110.

A characteristic of the present exemplary embodiment is that the conveyance robot 100 may be caused to run along a predetermined running path on the wall 128 by control of the four driving wheels 108 by the control device 138. Below, a configuration of the control device 138 is described in more detail.

As shown in FIG. 11, the control device 138 includes a CPU 138A, ROM 138B, RAM 138C, storage 138D, input/output interface 138E and bus 138F. The control device 138 has basically the same configuration as the control device 38 but differs from the control device 38 in being equipped with a communications interface 138G.

The motor drivers 36, first camera 112, second camera 114, upper side contact sensor 116 and lower side contact sensor 118 described above are connected to the input/output interface 138E.

The communications interface 138G is an interface to be used for communications between the control device 138 and wireless equipment. The control device 138 is capable of communicating with the wireless controller 102 via the communications interface 138G.

As shown in FIG. 10, the wireless controller 102 is disposed at the wall face 128A of the wall 128, and is equipped with an ascend switch 102A, a descend switch 102B and a stop switch 102C. When the ascend switch 102A is pressed, the wireless controller 102 transmits ascend command signals to the control device 138. When the descend switch 102B is pressed, the wireless controller 102 transmits descend command signals to the control device 138. When the stop switch 102C is pressed, the wireless controller 102 transmits stop command signals to the control device 138.

Figure 12:
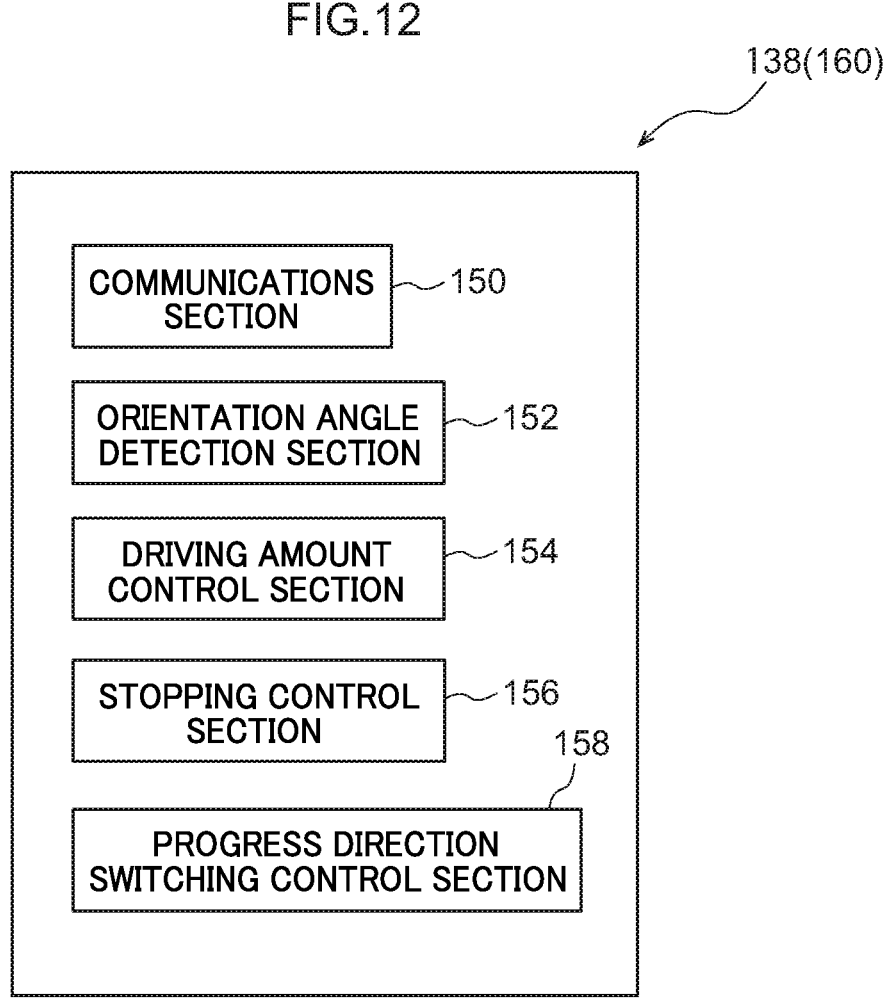
FIG. 12 is a block diagram showing functional structures of a control device installed at the conveyance robot according to the second exemplary embodiment.

The CPU 138A of the control device 138 reads an executable program memorized in the ROM 138B and executes the program. Thus, as shown in FIG. 12, the control device 138 functions as a combination of a communications section 150, an orientation angle detection section 152, a driving amount control section 154, a stopping control section 156 and a progress direction switching control section 158.

The communications section 150 receives the various signals transmitted from the wireless controller 102 and sends these signals to the stopping control section 156 and the progress direction switching control section 158.

At intervals of a predetermined duration, the orientation angle detection section 152 compares an image of the running line 148 captured by the first camera 112 with an image of the running line 148 captured by the second camera 114. From differences between the images, the orientation angle detection section 152 detects an angle formed between the extension direction of the running line 148 and the progress direction of the conveyance robot 100, that is, an orientation angle.

By controlling the motor drivers 36, the driving amount control section 154 controls driving amounts of the motors 34 such that a running speed of the conveyance robot 100 is, for example, 0.5 m/s. The driving amount control section 154 makes a determination as to whether the orientation angle detected by the orientation angle detection section 152 is 0°. When the orientation angle is not 0°, the driving amount control section 154 controls the four motor drivers 36 independently and controls respective driving amounts of the motors 34 such that the orientation angle is 0°.

For example, when the progress direction of the conveyance robot 100 deviates to one side in the width direction from the running line 148, the driving amount control section 154 raises the rotary speeds of the motors 34 that drive the driving wheels 108 at the one side in the width direction and lowers the rotary speeds of the motors 34 that drive the driving wheels 108 at the other side in the width direction.

Thus, the driving wheels 108 are controlled by the first camera 112, the second camera 114 and the driving amount control section 154 as described above and the conveyance robot 100 may run along the running line 148. That is, a region of the wall face 128A of the wall 128 along the running line 148 is set as a running path of the conveyance robot 100. Below, the combination of the first camera 112, second camera 114 and control device 138 is referred to as a driving control section 160.

When one or more of the first contact signals, the second contact signals and the stop command signals is inputted to the stopping control section 156 during running of the conveyance robot 100, the stopping control section 156 outputs stop signals to the motor drivers 36, and the motor drivers 36 stop driving of the motors 34.

More specifically, as illustrated in FIG. 9, a stopper 162 is provided at a portion of the running plate 130 at the building upper side. When the upper side contact sensor 116 comes into contact with the stopper 162 while the conveyance robot 100 is ascending, the motors 34 are stopped.

When the lower side contact sensor 118 comes into contact with a floor surface, which is not shown in the drawings, while the conveyance robot 100 is descending, the motors 34 are stopped. In the present exemplary embodiment, by pressing the stop switch 102C, a user may cause the motors 34 to stop when the conveyance robot 100 is at a height desired by the user.

The progress direction switching control section 158 controls the motor drivers 36 such that the conveyance robot 100 ascends when the ascend command signals are inputted, and controls the motor drivers 36 such that the conveyance robot 100 descends when the descend command signals are inputted.

Operation and Effects of the Present Exemplary Embodiment

Now, operation and effects of the present exemplary embodiment are described.

In the present exemplary embodiment, as shown in FIG. 10, the running line 148 that is used for guiding the running path of the conveyance robot 100 is provided along the wall face 128A of the wall 128. Therefore, damage to the running line 148 by movements of people, objects and the like in the building 28 may be suppressed.

As shown in FIG. 9, the decorative panel 110 is provided at the lower side of the main body 106. The decorative panel 110 is accommodated in the penetrating portion 146 provided at the ceiling 142, and the decorative panel 110 may structure a portion of the ceiling face 142A of the ceiling 142.

At least the outer periphery portions of the driving wheels 108 are structured with magnets. Meanwhile, the running plate 130 that structures a portion of the wall 128 and includes a ferromagnetic body extends in the vertical direction at the lower side of the penetrating portion 146 of the ceiling 142. Therefore, the driving wheels 108 are attracted to the running plate 130 and the conveyance robot 100 may run along the wall 128.

The driving control section 160 is equipped with the first camera 112 and the second camera 114. The first camera 112 and second camera 114 may detect the running line 148 extending in the vertical direction at the lower side of the penetrating portion 146, as seen in the horizontal direction. Therefore, the progress direction of the conveyance robot 100 may be set to the vertical direction.

Figure 13:
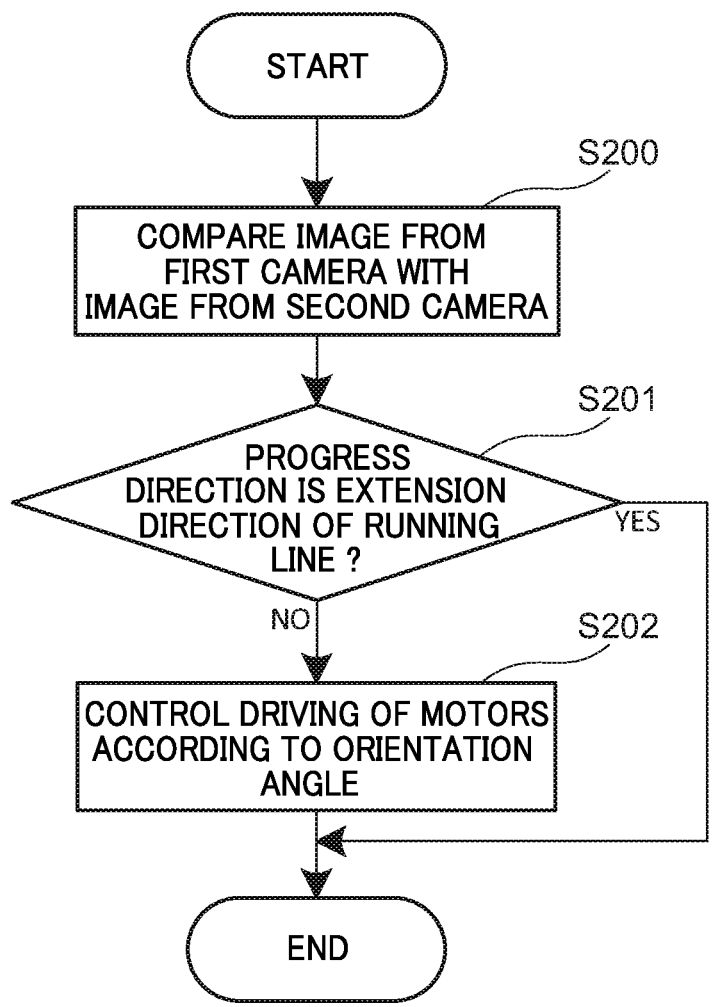
FIG. 13 is a flowchart showing a control flow of the conveyance robot according to the second exemplary embodiment that is conducted by the control device installed at the conveyance robot.

Below, an example of control flow of the conveyance robot 100 by the control device 138 is described, principally using the flow chart shown in FIG. 13. This control flow is started at predetermined time intervals when the CPU 138A receives predetermined control signals.

When this control flow begins, in step S200, the CPU 138A functions as the orientation angle detection section 152, detects an orientation angle by comparing an image of the running line 148 captured by the first camera 112 with an image of the running line 148 captured by the second camera 114, and proceeds to step S201.

In step S201, the CPU 138A functions as the driving amount control section 154 and makes a determination as to whether the orientation angle is at 0°, that is, whether the progress direction of the conveyance robot 100 is the extension direction of the running line 148. When the orientation angle is at 0° ("Yes" in step S201), the CPU 138A ends the control flow. On the other hand, when the orientation angle is not at 0° ("No" in step S201), the CPU 138A proceeds to step S202.

In step S202, the CPU 138A functions as the driving amount control section 154, controls the motor drivers 36 on the basis of the orientation angle detected in step S200 such that the orientation angle is 0°, and ends the control flow.

Thus, in the present exemplary embodiment, the conveyed object 32 placed on the main body 106 may be stowed above the ceiling as illustrated in FIG. 9 at usual times without adversely affecting the appearance of the ceiling 142. Then, when the conveyed object 32 is required, the conveyance robot 100 may be caused to move to the lower side in the vertical direction and the conveyed object 32 may be moved from above the ceiling.

Therefore, in the present exemplary embodiment, dead space in the building 28 may be used for stowage and conveyance of the conveyed object 32.

Supplementary Descriptions of the Exemplary Embodiments

In the first exemplary embodiment described above, angle signals are outputted from the turning angle sensor 46 to the control device 38, and the control device 38 controls the motor drivers 36 on the basis of the angle signals, but this is not limiting. For example, the angle signals may be outputted directly from the turning angle sensor 46 to the motor drivers 36, and the motor drivers 36 may control the motors 34 on the basis of the angle signals. With this configuration, structures of the conveyance robot 100 may be simplified further.

In the first exemplary embodiment, the turning angle sensor 46 is used for controlling the driving wheels 18 such that the progress direction of the conveyance robot 10 matches the extension direction of the railing 66, but this is not limiting. For example, similarly to the second exemplary embodiment described above, a running line along the running direction of the conveyance robot 10 may be provided above the railing 66, a pair of cameras capable of imaging the running line may be mounted at the conveyance robot 10, and the driving wheels 18 may be controlled on the basis of images of the running line captured by the cameras such that the progress direction of the conveyance robot 10 matches the extension direction of the running line. According to this kind of structure, a running path of the conveyance robot 10 may be set even with structures in which sandwiching of a railing provided at the wall 64 by a pair of rollers 56 is difficult.

In the second exemplary embodiment, the running line is constituted by black vinyl tape, black paint or the like, but this is not limiting. For example, a groove may be provided in the wall and the groove may be used as the running line. Thus, damage to the running line may be even further suppressed.

In the second exemplary embodiment, the conveyance system 104 is disposed at the wall 128 and ceiling 142 of the building 28, but this is not limiting. For example, the conveyance system 104 may be disposed at an elevator provided in the building 28, and the conveyed object 32 may be stowed above a ceiling of the elevator.

What is claimed is:

1. A conveyance robot comprising:
    a main body at which a conveyed object can be placed;
    a driving wheel provided at the main body;
    an imaging device;
    a memory that stores a program; and
    a processor coupled to the memory,
    wherein the processor executes the program to:
        control the driving wheel such that a progress direction of the conveyance robot is configured to match an extension direction of a running path guide portion, the running path guide portion extending along a running path that is along a wall face of a vertical wall disposed in a building,
        detect the running path guide portion with the imaging device, the running path guide portion extending in a vertical direction of the wall face, as viewed in a horizontal direction, and
        move the driving wheel in the vertical direction along the running path guide portion so as to move the main body in the vertical direction along the wall face of the vertical wall.

2. The conveyance robot according to claim 1, wherein:
    the processor further executes the program to:
    control the driving wheel to move the main body in the vertical direction to cause the conveyance robot to move into a space formed by a portion of a ceiling of the building;
    at least an outer periphery portion of the driving wheel includes a magnet that is attracted to a running plate, wherein the running plate includes a ferromagnetic body, which forms a portion of the wall and extends in the vertical direction at a lower side of the space, so that the driving wheel moves in the vertical direction along the running plate; and
    detect the running path guide portion with the imaging device, the running path guide portion extending in the vertical direction at the lower side of the space, and
        control the driving wheel such that an orientation angle formed between the progress direction of the conveyance robot and the extension direction of the running path guide portion is 0°, relative to the orientation angle in a case in which the progress direction of the conveyance robot matches the extension direction of the running path guide portion,
    wherein the conveyance robot is moved in the vertical direction along the running path guide portion from and toward the space.

* * * * *